United States Patent [19]

Tanaka

[11] 4,041,509
[45] Aug. 9, 1977

[54] SINGLE LENS REFLEX CAMERA

[75] Inventor: Harumi Tanaka, Kobe, Japan

[73] Assignee: Minolta Camera Kabushiki Kaisha, Japan

[21] Appl. No.: 628,312

[22] Filed: Nov. 3, 1975

[30] Foreign Application Priority Data

Nov. 2, 1974  Japan .................... 49-126097
Dec. 27, 1974  Japan .................... 49-002268

[51] Int. Cl.² .................................. G03B 19/12
[52] U.S. Cl. .................................. 354/152; 354/156; 354/219
[58] Field of Search ............ 354/152, 156, 219, 224, 354/226, 155, 150, 153, 154; 355/45, 66, ; 350/34

[56] References Cited

U.S. PATENT DOCUMENTS

| | | | |
|---|---|---|---|
| 1,807,613 | 6/1931 | Bauersfield et al. | 350/34 X |
| 2,579,247 | 12/1951 | Angenieux | 354/156 |
| 3,391,626 | 7/1968 | Ettischer et al. | 354/156 |
| 3,468,232 | 9/1969 | Knapp | 354/156 |
| 3,733,988 | 5/1973 | Tenne | 354/152 |
| 3,911,454 | 10/1975 | Ohmori | 354/152 |

Primary Examiner—L. T. Hix
Assistant Examiner—Alan Mathews
Attorney, Agent, or Firm—Watson, Cole, Grindle & Watson

[57] ABSTRACT

A single lens reflex camera having a mirror and mechanism for driving the mirror. The mirror is mounted on an end plane of a lever pivotally supported on a shaft mounted in the body of the camera. The shaft extends substantially in parallel with the axis of a picture-taking optical path for the objective lens of the camera. By pivoting the lever, it can be moved out of the optical path. The lever is movable between a viewing position, a first position, in which the mirror is positioned along the optical path at an angle of 45° with the path, and a picture-taking position, a second position, in which the mirror is completely retracted from the optical path. A mirror operating mechanism is provided for shifting the lever and the mirror from the first position to the second in response to a shutter releasing operation. A mirror returning mechanism subsequently returns the lever and the mirror from the second position back to the first in response to the completion of an exposure operation by the shutter.

12 Claims, 4 Drawing Figures

SINGLE LENS REFLEX CAMERA

BACKGROUND OF THE INVENTION

The present invention relates to a mirror driving mechanism for a single lens reflex camera, especially to a pocket-type camera using a 16mm size film or 110 type film.

In most conventional single lens reflex cameras using film or other light sensitive materials which are of a size of 35mm and larger, a reflex mirror is supported within a mirror box by means of a supporting member having substantially the same size as that of the mirror. This supporting member is designed to rotate about an axis perpendicular to the optical axis of the objective lens of the camera. Examples of such systems are shown in U.S. Pat. Nos. 3,768,390 and 3,777,637, issued to Kobori and Kuramoto et al, respectively. In this respect, the rotations of the mirror and supporting member are controlled by a control mechanism which is mounted on the side wall and/or bottom wall of a mirror box.

Such an arrangement, however, is confronted by difficulties with a small size single lens reflex camera using a 16mm or 110 type film, i.e., when the reflex mirror is supported in the same manner as in the conventional type camera. In such a situation, the positional accuracy of the reflex mirror is hard to control because of the small size of the reflex mirror. Furthermore, the components of the mechanism to control the movement of the mirror should be made relatively small in size.

In general, the mirror control mechanism needs to accomplish three types of movements, i.e., (i) retaining the mirror in a viewing position, (ii) shifting the mirror from its viewing position to its picture-taking position in response to a shutter releasing operation, and (iii) returning the mirror back to its viewing position in response to the completion of a shutter closing operation. In addition, these movements of the control mechanism must be interrelated with a shutter-release-initiating mechanism, shutter driving mechanism and diaphragm mechanism, thus resulting in a complex arrangement. It is difficult, however, to fabricate such mechanisms with small size components so as to accommodate their sizes to such a small size mirror.

On the other hand, with the conventional type single lens reflex camera, the rear end of an objective lens is adapted to be positioned as close to a focal plane as possible, by allowing the tip of the reflex mirror to move in a substantially vertical direction. It is also difficult to adopt such a mirror control mechanism for a small size mirror.

SUMMARY OF THE INVENTION

The object of the present invention is to provide a novel mirror-driving mechanism adapted for a small or pocket-type single lens reflex camera.

Another object of the present invention is to provide such a novel mirror-driving mechanism which is capable of driving a small size reflex mirror and controlling the position of the mirror with a high degree of accuracy.

A further object of the present invention is to provide a small size or pocket-type single lens reflex camera having a mechanism for driving a small reflex mirror from its viewing position to its picture-taking position and vice versa, in response to the shutter releasing and closing operations, respectively, and for controlling the diaphragm aperture of the camera in association with such movements of the mirror.

A still further object of the present invention is to provide a small size or pocket-type single lens reflex camera in which the rear end of the objective lens of the camera may be disposed adjacent to the foremost edge of the reflex mirror when located in its viewing position.

In order to accomplish these objectives, there is provided in accordance with the present invention a mirror driving mechanism capable of being used in such a small size single reflex camera. The mirror of this camera is mounted at the tip of a lever which is pivotally mounted on a shaft. This shaft is anchored to the body of the camera and extends in a direction substantially parallel with the axis of the picture-taking optical path for the objective lens of the camera. The shaft, however, is offset from the optical path. The lever is movable between a viewing position, a first position, in which the reflecting surface of the mirror is positioned along the optical path at an angle of 45° to the axis of the optical path, and a picture-taking position, a second position, in which the reflecting surface of the mirror is completely retracted from the optical path. A mirror operating mechanism is provided for shifting the mirror from the first position to the second in response to a shutter releasing operation and a mirror returning mechanism is provided for returning the mirror from the second position back to the first in response to the completion of the exposure operation by means of the shutter.

With such an arrangement, the lever effects pivotal movement between its viewing position, the first position, and its picture-taking position, the second position, with the mirror maintained at an angle of 45° to the optical axis of the object axis of the objective lens. Accordingly, the tip of the mirror is maintained substantially a constant distance away from the rear end of the objective lens, during the pivotal movement of the lever, and thus does not interfere with the objective lens. This enables the space for the mirror to be significantly smaller, thereby resulting in a decrease of the volume of the camera in its entirety.

This also provides for other advantages of readiness for the mirror-operating mechanism to drive the mirror from its viewing position, the first position, to its picture-taking position, the second position, prior to commencement of the exposure operation in response to a shutter releasing operation as well as for the mirror returning mechanism to return the mirror from the second position back to the first in response to the completion of the exposure. In this respect, the mirror operating mechanism is biased so as to tend to move in one direction relative to the camera casing and is locked in its cocked position against this tendency due to the winding operation. The mirror operating mechanism is released from its locked condition due to the shutter releasing operation, thereby driving the mirror in the previously described manner. The mirror operating mechanism is also adapted to stop down a diaphragm which has been maintained in its open position, to a predetermined diaphragm aperture setting, prior to the commencement of exposure, as well as to bring the diaphragm back to its fully open position in response to the completion of the exposure.

This in turn allows the mirror driving mechanism for a single lens reflex camera to be built in a small size single lens reflex camera.

BRIEF DESCRIPTION OF THE DRAWINGS

FIG. 4 is a perspective view of a mirror supporting mechanism.

DESCRIPTION OF THE PREFERRED EMBODIMENTS

Figure 1:
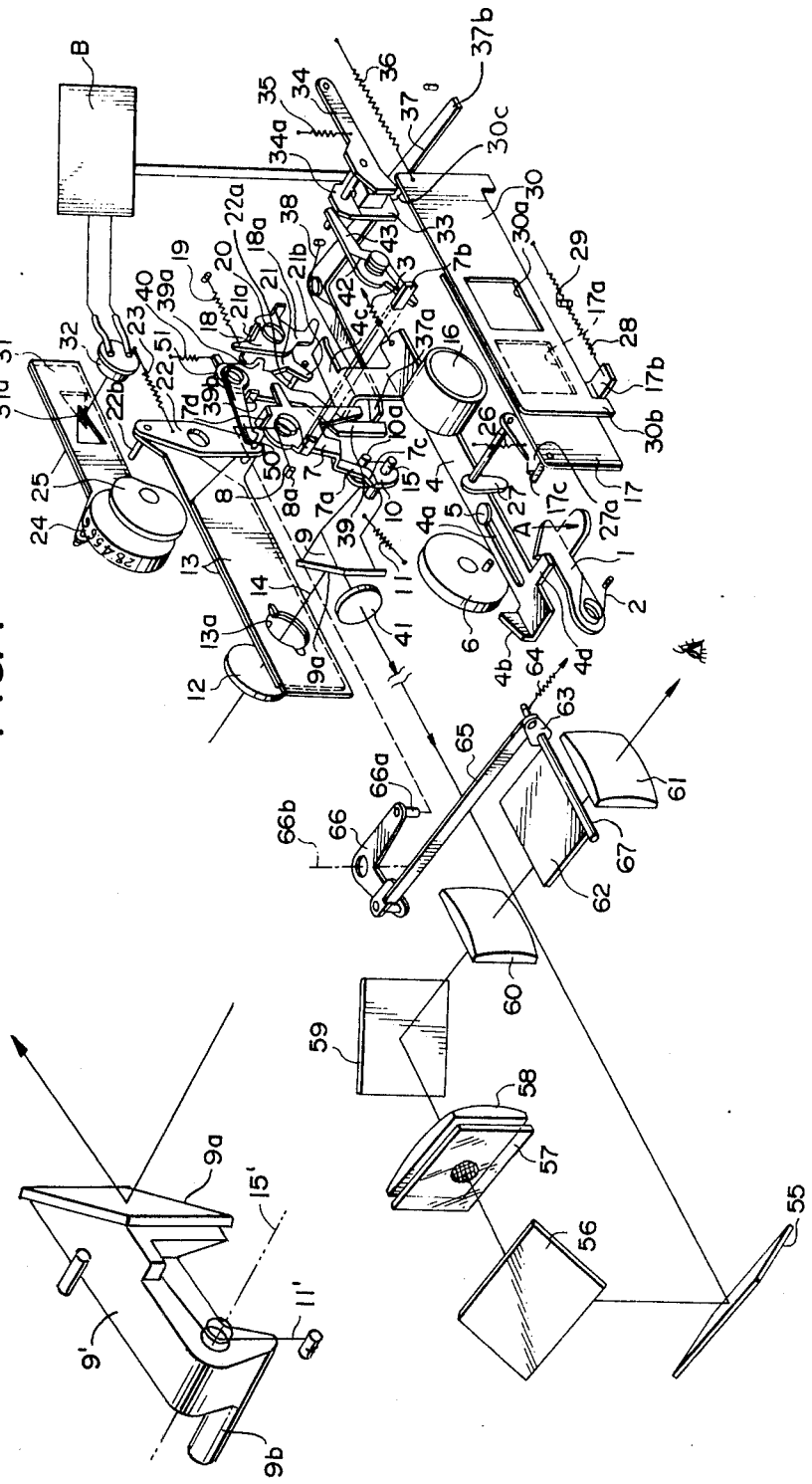
FIG. 1 is a perspective view of the essential part of one embodiment of a mirror driving mechanism for a single lens reflex camera according to the present invention.

In FIG. 1, there is shown a locking lever 1 which is pivoted to the body of a camera and is biased by a spring 2 so as to rotate in the counterclockwise direction. Locking lever 1 is adapted to rotate in the clockwise direction shown by the arrow against the force of spring 2, in association with a shutter releasing operation, although this feature is not illustrated.

An operating member 4 is biased by a spring 3 so as to move to the right, while a pin 5 anchored to the body of the camera is slidably fitted in slot 4a defined in operating member 4. Operating member 4 is adapted to be locked by means of locking lever 1 in its cocked position against the force of spring 3.

Operating member 4 is formed at its right-hand end with a bent mirror-operating piece 4c and at its left-hand end with a projection 4b which is adapted to engage a slow governor 6 in such a manner as to limit the speed of governor 6, when operating member 4 is driven from its cocked position to its rest position by means of spring 3. Operating member 4 is further formed with a shutter operating piece 4d adapted to engage locking lever 1 in its cocked position, and thus when the locked condition is released due to the shutter releasing operation, then operating member 4 is moved to the right under the action of spring 3.

A mirror operating member 7 is biased by a spring 8 so as to rotate in a counterclockwise direction so as to engage mirror operating piece 4c all the time. Mirror operating portion 7 is formed with an arm 7a adapted to engage a pin 10a which is anchored in a mirror operating lever 10 to be described below.

Mirror operating lever 10 is secured on a shaft 15 which is pivotally supported on the body of the camera and positioned away from the optical path of the picture-taking light passing through an objective lens 12 but in parallel with an optical axis 14 of objective lens 12. Pin 10a of mirror operating lever 10 extends in a direction parallel to shaft 15. Mirror operating lever 10 is integrally formed with a mirror lever 9 which is adapted to hold a mirror 9a. A spring 11 is provided between mirror lever 9 and the body of the camera so as to bias shaft 15 in a manner to rotate in a counterclockwise direction.

Practically, mirror lever 9 may be constructed as shown in FIG. 4, wherein 9' is a mirror lever somewhat modified from that of FIG. 1. Mirror lever 9' is supported by a shaft (not shown) to rotate about a rotational axes 15' and provided with on one end thereof a surface on which the reflex mirror 9a is secured and on the other end a projecting pin 9' which engages mirror lever so that the mirror 9a is operated through the projecting pin 9'b.

When operating member 4 is in its cocked position, the reflecting surface of mirror 9a on mirror lever 9, which is maintained in the position rotated in the counterclockwise direction, is positioned along the optical path of the picture-taking light for objective lens 12, with the center of the reflecting surface of the mirror positioned along optical axis 14. More particularly, mirror 9a is positioned in its viewing position, a first position, at an angle of about 45° to the optical axis 14, thereby reflecting light towards a lens 41 in a view finder. When operating member 4 is moved to the right from its cocked position, mirror operating member 7 is rotated in a counterclockwise direction by spring 8, so that arm 7a rotated mirror operating lever 10 in a clockwise direction by the medium of pin 10a. As a result, mirror lever 9 is also rotated in a clockwise direction against the force of spring 11, thereby rotating mirror 9a to its picture-taking position, second position, which is offset from the optical path of the picture-taking light for objective lens 12. Thus, light which has been transmitted through objective lens 12 advances linearly into a master lens 16, thus forming an image.

A first diaphragm operating lever 18 is positioned in the path of mirror operating piece 4c which is adapted to travel to the right. Lever 18 has an arm 18a engageable with the right-hand end of mirror operating piece 4c. Lever 18 is pivotable about a member journaled in the body of the camera and is biased by a spring 19 so as to rotate in a clockwise direction. A second diaphragm operating lever 21 is mounted on the same pivot point as first operating lever 18, so that the two levers are coaxial. Lever 21 is biased by a spring 20 so as to bring its bent piece 21a into engagement with first diaphragm operating lever 18. An arm 21b of second operating lever 21 is engageable with a pin 22a anchored in one end of a diaphragm operating lever 22 which is rotatable in the front portion of the camera body and is biased by a spring 23 so as to rotate in a clockwise direction. Journaled to the opposite ends of the aforesaid diaphragm operating lever 22 in an overlapped relationship are the ends of two sheets of diaphragm sectors 13 each formed with a respective diaphragm aperture 13a. Diaphragm apertures 13a in both diaphragm sectors 13 are slidably rotatable about optical axis 14 for objective lens 12 in directions opposite to each other, so that the opening to be defined by the two overlapping diaphragm apertures varies in size, depending on the extent of rotation of diaphragm operating lever 22.

A pin 22b projecting from one end of diaphragm operating lever 22 is engageable with a diaphragm setting cam 25 in the course of a diaphragm being stopped down due to the rotation of diaphragm operating lever 22. Cam 25 stops the rotation of diaphragm operating lever 22, so that the stopping-down operation for the diaphragm is interrupted.

Diaphragm setting cam 25 is rotatably supported on the camera body and is coaxial with a diaphragm adjusting ring 24. Ring 24 has a series of diaphragm aperture graduations on its circumferential surface. The size of diaphragm aperture 13a to be provided by means of diaphragm operating lever 22 is controlled in dependence upon the diaphragm aperture set on diaphragm adjusting ring 24.

Two sheets of light-measuring diaphragm plates 31 are pivotally supported, at its one end, on diaphragm adjusting ring 24. Triangular openings 31a are defined in each of light-measuring diaphragm plates 31. Diaphragm plates 31 slide commensurate to the rotation of diaphragm adjusting ring 24, so that light of a quantity commensurate to a diaphragm aperture setting is incident on a light measuring element 32. Element 32 is a photoelectric element and is connected to exposure time control circuit B. The exposure time is determined commensurate with the size of the diaphragm aperture. The output of exposure time control circuit B actuates an electromagnet 33.

When operating member 4 is moved to the right, after being released from its cocked condition, then diaphragm operating lever 22 which has been in the diaphragm open position is rotated by means of arm 21b of second diaphragm operating lever 21, whereupon in the course of the stopping down operation, pin 22b abuts diaphragm setting cam 25 so as to stop the stopping down operating at a preset diaphragm aperture. At this time, both pins 22a and 22b of diaphragm operating lever 22 are held between arm 21b and diaphragm setting cam 25, respectively, so that diaphragm sector plates 13 are prevented from overshooting, thereby providing a preset diaphragm aperture.

A locking lever 27a is coaxially mounted and rotatable with a shutter releasing lever 27 which is positioned along the path of travel of shutter operating piece 4d of member 4 and thus engageable with piece 4d. When member 4 moves to the right, then locking lever 27a rotates in a counterclockwise direction against the force of a spring 26. A front plate 17 of the shutter mechanism is slidably movable to the right relative to the camera body by means of a spring 28 provided between the camera body and plate 17. Plate 17 is provided with an opening 17a. Plate 17 is formed with a projection 17b engageable with a projection 30b of a rear plate 30, as well as with a pin 17c engageable with locking lever 27a. Thus, when front plate locking lever 27a is rotated in a counterclockwise direction, the engagement of both of the members are released, so that plate 17 begins moving to the right under the action of spring 28. Plate 17 stops when its bent piece 17a engages a stopper 29 anchored in the camera body. In this condition, the opening 17a in the front plate is brought into registry with an opening 30a in rear plate 30.

Rear plate 30 is slidingly movable relative to the camera body in parallel with front plate 17 by means of a spring 36 provided between the camera body and plate 30. Rear plate 30 is formed with the opening 30a, a projection 30b engageable with bent piece 17b and pin 30c at its rear end. When front plate 17 is moved to the left, against the force of spring 28, to its cocked position, rear plate 30 as well is moved to the left to its cocked position against the force of spring 36 since its projection 30b is engaged with bent piece 17b. In this cocked position, pin 30c engages a rear plate locking lever 34 (to be described below) whereupon the center of opening 30a is brought into position along the optical axis of objective lens 12 and master lens 16.

Rear plate locking lever 34 is rotatably supported on the camera body and biased by spring 35 so as to rotate in a clockwise direction, thereby being disconnected from pin 30c. Armature 34a of lever 34 is adapted to cooperate with electromagnet 33 and locks rear plate 30 against the force of spring 35, when the electromagnet is excited. A pressing lever 43 is rotatably supported on the camera body so as to engage armature 34a and is biased by a spring 42 so as to rotate in a clockwise direction. Lever 43 has one end in abutment with armature 34a. Lever 43 is engageable at its other end with bent arm 7a extending from mirror operating member 7. Thus, when mirror operating lever 7 is rotated in a counterclockwise direction, one end of pressing lever 43 is averted from armature 34a against the force of spring 42.

A connecting lever 37 is rotatably supported on the bottom portion of the camera body and is biased by a spring 38 so as to position one of its ends 37b along the path of travel of rear plate 30. The other end 37a of connecting lever 37 engages a mirror returning lever 39 for use in quickly returning the mirror.

Mirror returning lever 39 is rotatably supported on a shaft relative to the camera body, which shaft extends in a direction parallel with the rotational shaft of mirror operating member 7 and the rotational shaft of both first operating lever 18 and second diaphragm operating lever 21. In addition, mirror returning lever 39 is biased by spring 40 as as to rotate in a counterclockwise direction. Spring 40 has a force greater than those of spring 8 for mirror operating member 7 and spring 20 for second operating lever 21. Thus, as has been described earlier, when rear plate 30 travels so as to complete exposure, connecting lever 37 is rotated in a counterclockwise direction against the force of spring 38 so as to cause connection lever 37 to disengage from mirror returning lever 39. Mirror returning lever 39 is then rotated in a counterclockwise direction by means of spring 40 so that its projection 39a engages bent piece 21a of second diaphragm operating lever 21, thereby rotating second operating lever 21 in a clockwise direction, whereupon bent piece 39b rotates mirror operating member 7 in a clockwise direction against the force of spring 8. In this manner, mirror 9a which has remained in the picture-taking position, the second position, is returned to its viewing position, the first position. Mirror operating lever 7, which is thus rotated in a clockwise direction, stops in its viewing position, when its bent piece 7d is locked by means of a mirror stopping lever 50. Mirror stopping lever 50 is supported coaxially for integral movement with mirror returning lever 39. upon such operation, the clockwise rotation of second diaphragm operating lever 21 releases pin 22a from being pressed by arm 21b, so that diaphragm operating lever 22 is again rotated in a clockwise direction under the action of spring 23, thereby returning diaphragm plates 13 to their diaphragm open position.

On the other hand, when mirror operating member 7 is again rotated in a clockwise direction, bent arm 7b is disengaged from a pressing lever 43, while pressing lever 43 presses armature 34a by means of spring 42 against the force of spring 35 so as to urge armature 34a against electromagnet 33.

A shutter which has been released is brought back into its cocked position in such a manner that operating member 4 and front plate 17 are moved to the left in response to the operation of a cocking member (not shown). With the leftward movements of front plate 17, bent piece 17b engages projection 30b so as to move rear plate 30 to the left, whereupon both plates 17 and 30 are locked by means of front plate locking lever 27a and rear plate locking lever 34, respectively. Additionally, shutter operating piece 4d of operating member 4 is locked by means of locking lever 1.

A view finder system including elements 55 through 61 is shown on the left side in FIG. 1. The light which has been introduced from a photographic object and reflected on a movable reflex mirror 9a in the viewing position passes through a lens 41 and is focused by way of fixed mirrors 55 and 56 on a focussing plate 57. The image thus focused may be observed through the medium of a condensor lens 58, fixed mirror 59 and lenses 60 and 61. A light blocking mechanism formed by elements 62 through 67 serves to block the light introduced through a finder eye piece into a camera. As has been described earlier, when mirror operating member 7 is rotated due to the movement of operating member 4, pin 66a is pressed by means of bent piece 7d of lever 7 so as to cause lever 66 to rotate about shaft 66b. In turn shaft 66b pulls connecting rod 65 forward so that a rocking plate 63 secured on a shaft 67, which secures a light shielding plate 62 thereon, is rotated against the force of a spring 64. As a result, light shielding plate 62 is rotated to face or oppose to lens 61, thereby blocking light from being transmitted through lens 61 into the camera. When mirror operating member 7 is returned, concurrently with the returning movement of movable mirror 9a, then light shielding plate 62 returns to the position shown, under the action of spring 64. Such a light blocking mechanism is particularly advantageous in preventing any flare due to unwanted light for a mechanism where the movable mirror in its retracted position fails to block the light which is being introduced into the camera casing along the optical path of a finder in a reverse direction.

In case the electromagnet is not excited due to consumed cells, i.e., drained, in the shutter control circuit, the blocking mechanism may be so designed as to lock the blocking mechanism in its blocking position. This can be accomplished by means of a lever which cooperates with armature 44. This will provide a warning of the consumed condition of cells by the blocking condition of the light shielding plate.

As is apparent from the foregoing description, when, due to the releasing operation, operating member 4 is released from its cocked position and hence starts moving to the right, then a switch (not shown) is first closed, so that the exposure time control circuit B is actuated. Upon actuation of circuit B, electromagnet 33 attracts armature 34a into an abutting relationship.

Subsequently, as operating member 4 is moving to the right, with its speed being limited by means of slow governor 6, mirror operating piece 4c allows the counterclockwise rotation of mirror operating member 7. This rotation of member 7 causes the clockwise rotation of mirror lever 9 so as to rotate mirror 9a from its viewing position, the first position, to its picture-taking position, the second position. In turn, pressing lever 43 is rotated in a counterclockwise direction against the force of spring 42. As a result, armature 34a is released from a pressed condition due to pressing lever 43. In this respect, armature 34a is attracted to electromagnet 33 which is excited by the output of exposure time control circuit B maintained in an operable condition, and remains in this position.

In addition, the rightward movement of the mirror operating piece rotates first operating lever 18 in a counterclockwise direction, thereby allowing the counterclockwise rotation of second diaphragm operating lever 21, so that diaphragm operation lever 22 is rotated in a clockwise direction. Rotation of lever 22 causes the sliding movements of diaphragm plates 13 in opposite directions relative to each other, so as to stop down diaphragm aperture 13a progressively to a diaphragm aperture which has been preset by means of diaphragm setting ring 24.

Upon completion of the movement of mirror 9a from its viewing position to its picture-taking position as well as upon completion of the stopping down operation of the diaphragm, the shutter operating piece 4d of member 4 which is moving to the right, comes into abutment with lever 27 so as to rotate the lever in the counterclockwise direction. This rotation of lever 27 causes front plate 17 to be disengaged from front plate locking lever 27a. Front plate 17 then begins to move to the right under the action of spring 28, whereupon its opening 17a is brought into registry with opening 30a in rear plate 30 which remains stationary so as to commence exposure.

Concurrently with exposure, a trigger switch (not shown) in exposure time control circuit B is actuated so as to begin counting the timing. The timing is initiated by the light transmitted through opening 31a from a photographic object, depending on the preset aperture with an optimum level of exposure being obtained after a given lapse of time. Then, a subsequent output of exposure time control circuit B demagnetizes electromagnet 33, so that rear plate locking lever 34 is rotated in a clockwise direction under the action of spring 35, thereby releasing rear plate 30 from its locked condition. Thus, rear plate 30 as well begins moving to the right so as to complete the exposure. Since rear plate 30 abuts the connecting lever 37, it rotates lever 37 in a clockwise direction, so that mirror returning lever 39 is released from its locked condition. As a result, mirror returning lever 39 rotates in a clockwise direction under the action of spring 40 to thereby rotate mirror operating member 7 in a clockwise direction against the force of spring 8, so that mirror operating member 7 is stopped by means of mirror stopping lever 50. Meanwhile, second diaphragm operating lever 21 is rotated in a clockwise direction against the force of spring 20, thereby returning from 9a fron the picture-taking position to the viewing position and locks the mirror in this position. The diaphragm aperture is also returned simultaneously to its fully open position.

With the first embodiment, the light from an object which is being introduced through opening 31, rather than through objective lens 12 and diaphragm 13a, is incident on a light receiving element 32 so as to control exposure time control circuit B. Alternatively, however, the light which has been transmitted through objective lens 12 and diaphragm aperture 13a may be incident on the light receiving element, at the time of viewing, so that its light measuring output may be stored.

In addition, with the above-described embodiment, arm 7a of mirror operating member 7 directly engages 10a of mirror operating lever 10 which is coaxial and integral with mirror lever 9, which is biased so as to normally be positioned in the viewing position, to thereby move the mirror against the biasing force. Such an arrangment, however, should not be construed in a limitative sense. Alternatively, mirror lever 9 may be biased by a spring so as to rotate from the viewing position, the first position, to the picture-taking position, the second position, so that due to the mirror operating member being retracted from mirror lever 9, mirror lever 9 may be rotated from its viewing position to its picture-taking position.

Figure 2:
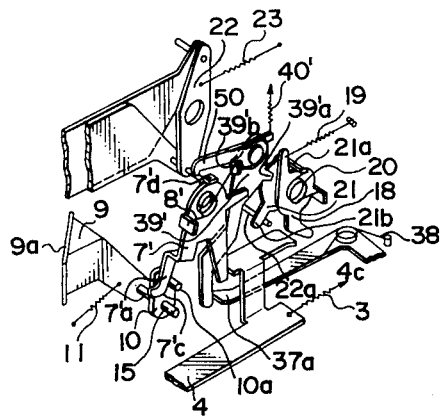
FIG. 2 is a perspective view illustrative of the modified portion of another embodiment of the present invention.

FIG. 2 shows a second embodiment of the invention, in which a spring 8' is provided between mirror operating member 7' and bent piece 39' of mirror returning lever 39b' which is adapted to return the mirror. In this manner, spring 8' need not be compressed when mirror returning lever 39' is rotated by spring 40' in a counterclockwise direction so as to rotate mirror operating member 7' to its initial position, thereby reducing the loading force of spring 8'. With this arrangement, the force required to rotate returning lever 39' in a clockwise direction so as to be reset can be reduced.

Figure 3:
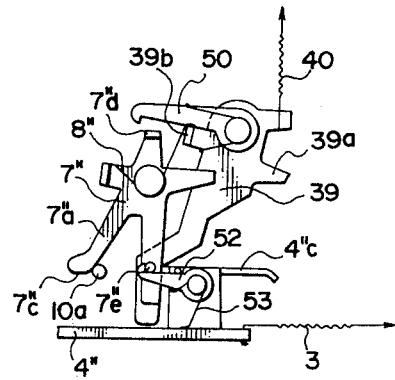
FIG. 3 is a side view of the modified portion of still another embodiment of the present invention, which is a modification of the first embodiment.

With the first embodiment shown in FIG. 1, mirror operating member 7 follows operating member 4, when member 4 is moving to the right. With a third embodiment as shown in FIG. 3, however, a hook 52 is rotatably supported on an operating member 4" so as to be biased by a spring 53 to rotate in a clockwise direction. In this manner when sensor 4" is moved to the right, hook 52 engages a pin 7e" which is anchored on a mirror operating member 7", so as to rotate mirror operating member 7" in a counterclockwise direction. After a given movement of hook 52 together with mirror operating member 7", pin 7e" is disengaged from hook 52 so as to release the mirror operating member. This prevents any possible delay in the movement of mirror operating member 7" relative to the rightward movement of operating member 4" and allows the actuation of mirror operating member 7" simultaneously with the commencement of the rightward movement of operating member 4". Consequently, there can be prevented any possibility of an exposure being commenced by the shutter, before mirror 9a is moved from its first position to its second position so as to be retracted from the optical path of the picture-taking light.

Moreover, with this third embodiment, hook 52 is adapted to abut pin 7e", when operating member 4" is cocked to the left, so that it may be rotated in a counterclockwise direction against the force of spring 53 so as to go over pin 7e" until it engages pin 7e".

It is noted that the above description and the accompanying drawings are provided merely to present exemplary embodiments of the present invention and that additional modifications of such embodiments are possible within the scope of this invention without deviating from the spirit thereof.

I claim:

1. A single lens reflex camera having an objective lens, a shutter member, means for opening the shutter to initiate exposure, means for closing the shutter to terminate the exposure and a mirror driving mechanism, the mirror driving mechanism comprising:
    a shaft arranged off the optical path of picture-taking light transmitted through said objective lens and in parallel with the optical axis of said objective lens;
    a lever pivotally supported on said shaft and pivotable between a first position and a second position;
    a mirror having a reflecting surface, said mirror being rigidly mounted on said lever so that when said lever is in said first position said mirror is positioned in a viewing position where the center of said reflecting surface is positioned substantially along the optical axis of said objective lens and when said lever is pivoted into its second position said mirror is simultaneously pivoted with said lever into a picture-taking position where said reflecting surface is retracted from the optical path of picture-taking light transmitted through said objective lens;
    operating means for pivotally moving said lever from said first position to said second position, prior to commencement of an exposure operation, in response to a shutter releasing operation; and
    returning means for returning said lever from said second position to said first position in response to completion of such exposure operation.

2. A camera as defined in claim 1, wherein said operating means is movable between a cocked position and a rest position, and said operating means moves said lever from said first position to said second position, when it moves from its cocked position to its rest position.

3. A camera as defined in claim 2, wherein said operating means in its cocked position engages said lever and releases said lever from its engaged condition, when said operating means moves from its cocked position to its rest position.

4. A camera as defined in claim 2, wherein said mirror driving mechanism further comprises locking means for locking said operating means in its cocked position in response to a shutter releasing operation.

5. A camera as defined a claim 4, wherein said mirror driving mechanism further comprises: a first shutter member movable between a cocked position and a rest position, said first shutter member serving to block picture-taking light transmitted through said objective lens in its cocked position and to allow the passage of such picture-taking light in its rest position.

6. A camera as defined in claim 5 further comprising a second shutter member located behind said first shutter member, said second shutter member being movable between a cocked position and a rest position and in its cocked position allowing the passage of picture-taking light passing through said objective lens and said first shutter member and in its rest position blocking such picture-taking light; and wherein said returning means pivotally returns said lever from its second position to its first position, after said second shutter member has assumed its rest position and blocks the picture-taking light.

7. A camera as defined in claim 5, further comprising: a diaphragm capable of being stopped down from a fully opened aperture to a smaller aperture; stop down means for stopping down said diaphragm and having a stopping-down tendency; a diaphragm locking member for locking said diaphragm in its open position; a diaphragm presetting member for stopping said diaphragm, which is being stopped down, at a present diaphragm aperture position; releasing means for causing said diaphragm to return to its fully opened aperture; further operating means for releasing said first shutter member from its cocked position in response to a shutter releasing operation and in turn releasing said diaphragm locking member which locks said diaphragm in its open position, so as to allow said diaphragm to be stopped down to its present diaphragm aperture, while said operating means also drives said lever from its first position to its second position.

8. A camera as defined in claim 7 further comprising a second shutter member located behind said first shutter member and movable between a cocked position and a rest position, said second shutter member in its cocked position allowing the passage of picture-taking light passing through said objective lens, said diaphragm and said first shutter member, and said second shutter member in its rest position blocking such picture-taking light; and wherein said returning means pivotally returns said lever from its second position to its first position, after said second shutter member has resumed its rest position and blocks the picture-taking light, and upon such occurrence said releasing means causes the release of said diaphragm from its preset diaphragm aperture so that it returns to its open position against the tendency of said stop down means.

9. A camera as defined in claim 1 further comprising: a finder optical system positioned along the optical path of the picture-taking light transmitted through said objective lens and reflected on said movable mirror positioned in its viewing position when said lever is positioned in its first position; and a moving plate positioned along the optical path of said finder optical system, when said lever is in its second position said movable plate being moved into a second position for blocking the optical path of said finder optical system and when said lever is in its first position said movable plate being moved into a first position for releasing said finder optical system from its blocked condition.

10. A camera as defined in claim 9 further comprising means for causing said movable plate to move into its second position when the energy level of a battery provided in said camera becomes drained.

11. A camera as defined in claim 1 wherein said mirror is mounted on said lever so as to be positioned at an angle of approximately 45° with respect to the axis of the optical path and said lever is pivotable in such a direction that said mirror maintains such angular relationship when said lever is in both its first and second positions.

12. A mirror driving mechanism for use in single lens reflex camera having an objective lens, a shutter member, means for opening the shutter to initiate exposure and means for closing the shutter to terminate exposure, the mirror driving mechanism comprising:
a shaft adapted to be arranged off the optical path of picture-taking light transmitted through the objective lens and in parallel with the optical axis of the objective lens;
a lever pivotally supported on said shaft and pivotable between a first position and a second position;
a mirror having a reflecting surface, said mirror being rigidly mounted on said lever so that when said lever is in said first position said mirror is positioned in a viewing position where the center of said reflecting surface can be positioned substantially perpendicular to the optical axis of the objective lens and when said lever is pivoted into its second position said mirror is simultaneously pivoted with said lever into a picture-taking position where said reflecting surface would be retracted from the optical path of picture-taking light transmitted through the objective lens;
operating means for pivotally moving said lever from said first position to said second position, prior to commencement of an exposure operation, in response to a shutter releasing operation; and
returning means for returning said lever from said second position to said first position in response to completion of such exposure operation.

* * * * *

UNITED STATES PATENT OFFICE
CERTIFICATE OF CORRECTION

PATENT NO. : 4,041,509
DATED : August 9, 1977
INVENTOR(S) : Harumi Tanaka

It is certified that error appears in the above-identified patent and that said Letters Patent are hereby corrected as shown below:

[30] Foreign Application Priority Date

December 27, 1974   Japan   50-002268

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*